H. BROWN.
RAIL JOINT.
APPLICATION FILED MAY 12, 1910.
990,835.
Patented May 2, 1911.
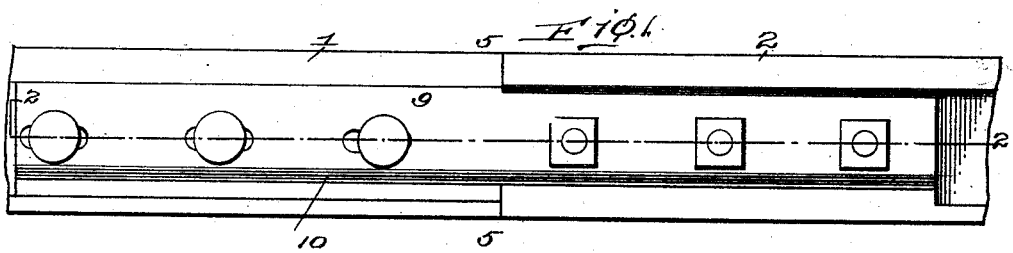
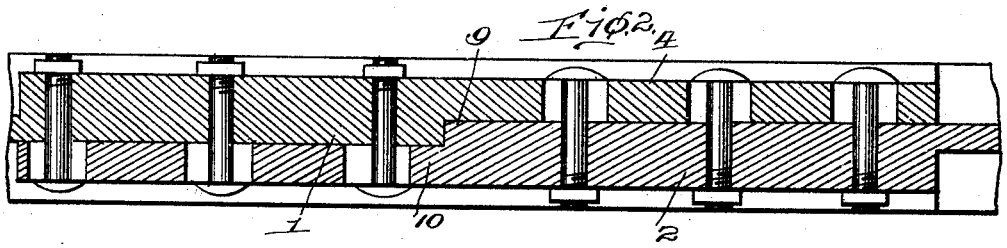
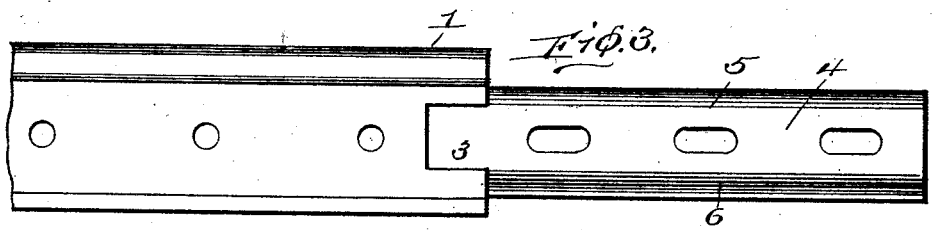
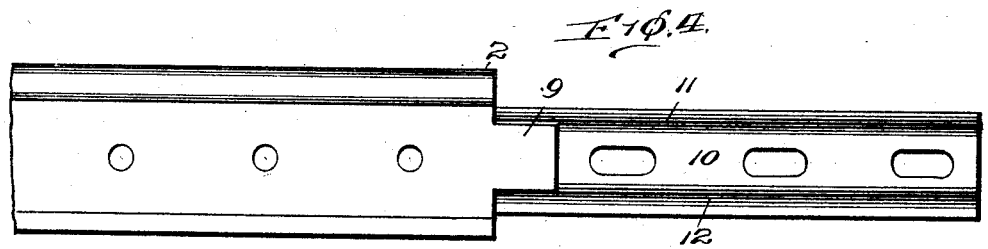
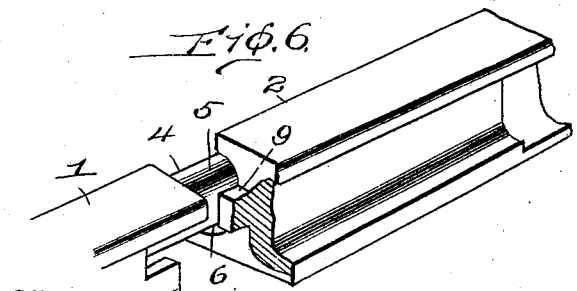
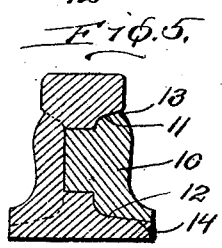
Witnesses
E. Seerist
Ann N. Butler
Inventors
Hollen Brown
By Mason Fenwick Lawrence
his Attorneys

UNITED STATES PATENT OFFICE.

HOLLEN BROWN, OF UPLAND, INDIANA, ASSIGNOR OF ONE-HALF TO VANE B. KORNER, OF UPLAND, INDIANA.

RAIL-JOINT.

990,835.  Specification of Letters Patent.  Patented May 2, 1911.

Application filed May 12, 1910. Serial No. 560,936.

*To all whom it may concern:*

Be it known that I, HOLLEN BROWN, a citizen of the United States, residing at Upland, in the county of Grant and State of Indiana, have invented certain new and useful Improvements in Rail-Joints; and I do hereby declare the following to be a full, clear, and exact description of the invention, such as will enable others skilled in the art to which it appertains to make and use the same.

This invention relates to improvements in rail joints, and particularly to rail joints having interlocking portions and overlapping end members.

The object in view is the arrangement in a rail joint, of a socket in the end of one rail and a lug in the end of the abutting rail for fitting into the socket, the socket and lug being arranged in combination with overlapping side members which act as a combined brace and strengthening member, and also as fish plates.

A further object of the invention is the arrangement in a rail joint, of overlapping fish plates formed integral with the abutting rails arranged to connect and brace the ends of the respective rails and to act in combination with the interlocking lug projecting from the end of one of the rails into the other.

A still further object of the invention is the arrangement of the end of one rail with a notch formed in the web thereof, and a fish plate formed integral with the rail and projecting beyond the same on one side, the fish plate and notch being arranged to fit into the abutting rail which is formed with a projecting lug and a fish plate formed integral therewith and positioned on the side opposite to the first mentioned fish plate, whereby both of the rails will have overlapping ends or fish plates which may be clamped or bolted in position for tying the rails together, said fish plates and said lug acting as supports for resisting any tendency of the ends of the rails to bend downward.

With these and other objects in view the invention comprises certain novel constructions, combinations, and arrangement of parts as will be hereinafter more fully described and claimed.

In the accompanying drawings: Figure 1 is a side elevation of an embodiment of the invention. Fig. 2 is a longitudinal section through Fig. 1 on line 2—2. Fig. 3 is a side view of the end of a rail constructed according to the present invention. Fig. 4 is a side view similar to Fig. 3, but of the abutting rail. Fig. 5 is a section through Fig. 1 on line 5—5. Fig. 6 is a detail fragmentary perspective view of a pair of rails formed with a joint embodying the invention, the same being shown slightly separated and also broken away for better disclosing the invention.

In constructing a joint embodying the invention the same is formed upon the rail so that no outside or extra attachments are necessary for connecting the various rails together, except the ordinary bolts. In forming the rails the opposite ends are made with the respective parts of the joint, that is, one end is formed with the projecting lug and the other end with a socket, and each end is provided with an overlapping fish plate.

In the accompanying drawings an embodiment of the invention is disclosed in which 1 and 2 indicate the ends of abutting rails. End 1 is formed with a notch or socket 3 and with a fish plate 4. Fish plate 4 is formed integral with the rail of which end 1 is a part, and projects any desired distance therefrom, preferably the distance that an ordinary fish plate would extend if fastened to end 1. Fish plate 4 is formed with a curved upper surface 5, and a curved lower surface 6 which are adapted to fit into the curved surfaces of the end 2 for supporting the ball or tread of the rail, and especially for supporting the end thereof. End 2 is formed with a lug or projection 9 which fits into socket or opening 3 and is adapted to support the end of the ball or tread of the end 1. End 1 is also supported by fish plate 10 which is formed with curved surfaces 11 and 12 fitting the curved surfaces 13 and 14 of end 1. By this structure end 1 is supported by lug or projection 9, and by the fish plate 10 which is formed integral with the rail of which end 2 is a part. After the ends have been fitted together suitable bolts 20 are passed through the apertures in the fish plates, and the rails, for bolting the respective fish plates to the rail, and thus securing the rails together. In forming lug or extension 9 the same is slightly shorter than opening or socket 3 for permitting expansion. By this arrangement it will be observed that the ends are supported by the interlocking lug 9, and by the respective fish plates 4 and 10, which engage the lower edge of the ball or tread, and which also engage the upper edge of the base, whereby strain is distributed over the entire rail, and consequently the ends are prevented from being bent downward or moved out of their proper place. Also by arranging the fish plates so that the curved portions 8 and 12 will engage the under side of the tread of the rails the strain is taken off the bolts and is transmitted to the tread of the rail, and also to the spikes.

What I claim is:

A rail joint comprising the meeting ends of two rail sections with vertical shoulders on opposite ends, one of which is provided with a socket therein having the tread of the rail overhanging the same, the other section having a lug projecting outwardly from its end, said lug being shorter than the length of the socket so as to permit of its being seated part-way in the socket, said sections having formed on one side fish plates having outwardly extended portions which are provided with curved upper and lower surfaces so as to fit entirely under the tread of the rail and extend entirely over the flange portion thereof, said extended ends of the rail and extend entirely over the bolts inserted through said openings and through the ends of the two sections whereby the said oblong openings permit of the lug having movement in the socket.

In testimony whereof I affix my signature in presence of two witnesses.

HOLLEN BROWN.

Witnesses:
JOHN L. FLETCHER,
VANE B. KORNER.

---

Copies of this patent may be obtained for five cents each, by addressing the "Commissioner of Patents, Washington, D. C."